April 10, 1928.

S. J. EVANS 1,665,586

AIR BRAKE VALVE

Filed Dec. 20, 1926

2 Sheets-Sheet 1

INVENTOR
S. J. Evans
BY
ATTORNEY

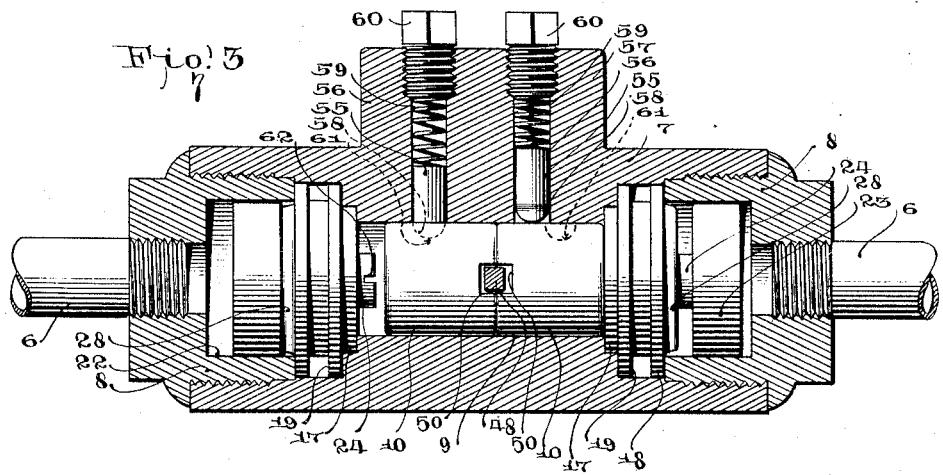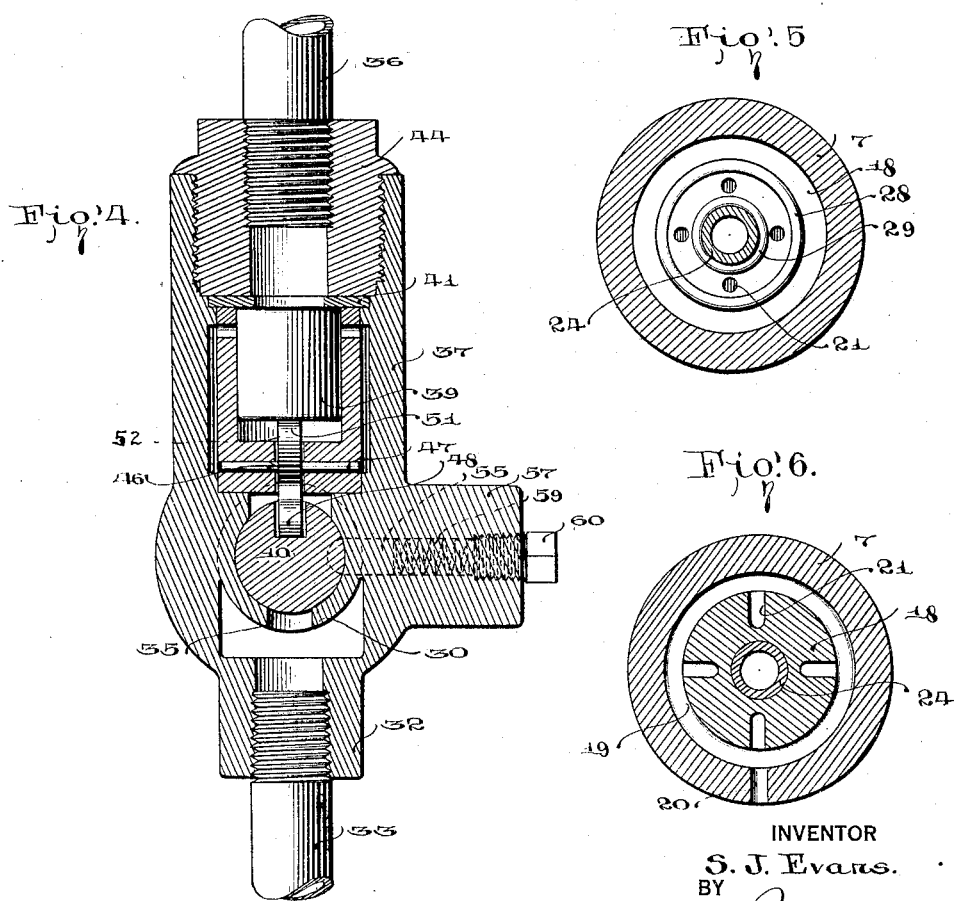

Patented Apr. 10, 1928.

1,665,586

UNITED STATES PATENT OFFICE.

SAMUEL J. EVANS, OF PRINCETON, WEST VIRGINIA.

AIR-BRAKE VALVE.

Application filed December 20, 1926. Serial No. 155,962.

My invention relates to improvements in valves for air brake systems, and it consists in the combinations, constructions and arrangements herein described and claimed.

A valve embodying the invention is intended primarily for use in an air brake system for a street car or like vehicle having an engineer's valve at each of its opposite ends and a single air brake line connecting the engineer's valves with each other and with an associated brake cylinder, each engineer's valve being operable to connect the air brake line with the air reservoir of the system for applying the brakes and with the atmosphere to release the brakes as desired. With an air brake system having the parts described, the inactive portion of the air brake line adjacent to each engineer's valve will be filled with air from the air reservoir each time the other engineer's valve is actuated to apply the brakes and such excess air is exhausted to the atmosphere when the engineer's valve that is in use at a given time is actuated to release the brakes and escapes to the atmosphere without having served any useful purpose. It is obvious that a considerable quantity of excess air will be wasted or drained from the air reservoir as the result of any considerable number of operations of an engineer's valve of an air brake system of the type referred to.

An object of the present invention is to obviate the passage of air into the inactive portion of the air brake line when the engineer's valve at either of the opposite ends of the air brake line is actuated to effect application of the associated brakes, thus preventing waste of air from the air reservoir of the system when the brakes are applied.

A further object of the invention is the provision of a valve of the character described which also is adapted to permit the passage therethrough of air from the emergency valve of the system to the brake cylinder when the emergency valve is open without permitting any of such air to pass into the brake line toward the engineer's valves and which will prevent the passage of air from the brake line toward the associated emergency valve when one of the engineer's valves has been operated and the emergency valve is closed.

A still further object of the invention is the provision of an air brake valve of the character described which will be automatic and reliable in use and thoroughly practical commercially.

Figure 1:
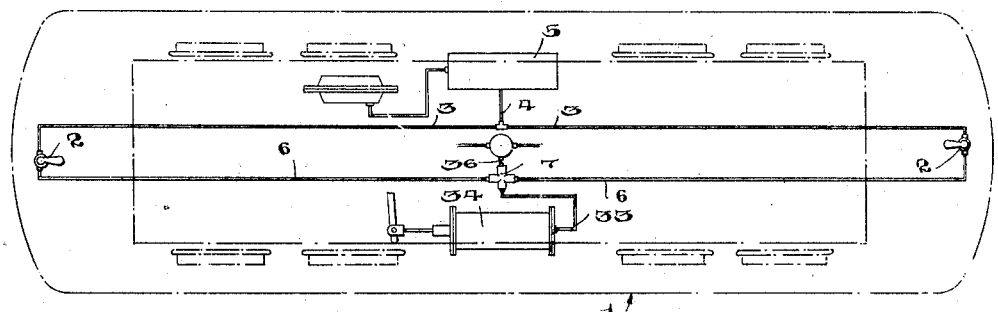
Figure 8:
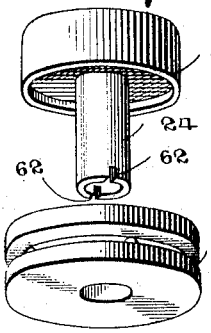
Figure 7:
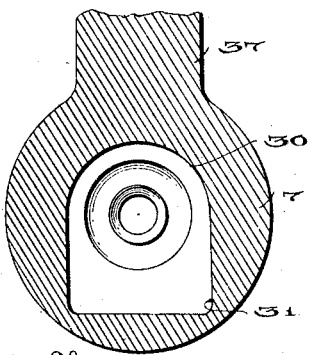
Figure 2:
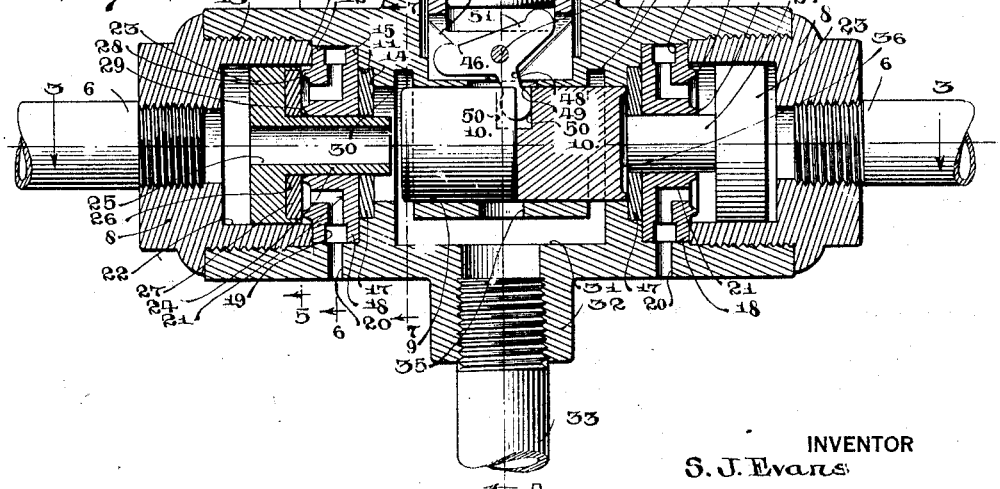

Other objects and advantages of the invention will be apparent from the following description, considered in conjunction with the accompanying drawings, in which Figure 1 is a diagrammatic view showing a valve embodying the invention in the brake line of the air brake system of a vehicle, Figure 2 is a plan sectional view of the improved valve and its connections, Figure 3 is a section substantially along the line 3—3 of Figure 2, Figure 4 is a section substantially along the line 4—4 of Figure 2, Figure 5 is a section substantially along the line 5—5 of Figure 2, Figure 6 is a section substantially along the line 6—6 of Figure 2, Figure 7 is a section substantially along the line 7—7 of Figure 2, and Figure 8 is a perspective view of an air drain valve and its seat which are included in the improved valve structure.

In Figure 1 the numeral 1 generally indicates a street car or like vehicle having an air brake system including an engineer's valve 2 located at or adjacent to each of its opposite ends. The valves 2 are connected by the pipes 3 and the pipe 4 with the air reservoir 5 of the air brake system. The delivery outlets of the valves 2 are connected by the sections 6 of the brake line with the opposite ends of the tubular body 7 of the improved valve when the invention is carried into effect, the connections between the members 6 and the opposite ends of the body 7 being effected by means of internally and externally screw threaded centrally apertured plugs 8 cooperating with external screw threads on the inner end portions of the member 6 and with the internal screw threads on the end portions of the body 7 as clearly shown in Figure 2.

The tubular body 7 is formed with an internally reduced portion 9 intermediate the ends of the body 7 for the reception of a pair of slidable piston valves 10. The inner wall of each end portion of the body 7 is stepped in size or diametrically at 11, 12 and 13, respectively, between the adjacent end of the chamber 9 and the extremity or edge of that end portion of the body 7, thus producing the outwardly facing shoulders at 14, 15 and 16, respectively, as clearly shown in Figure 2. The hereinbefore referred to internal screw threads on the end portions of the body 7 for engaging with the screw plugs 8 are provided on the portions 13 of the inner wall of the tubular body 7.

Annular valve seat members 17 made of rubber or any other suitable material are disposed in the portions 11 of the bore of the tubular body 7 and are forced against the shoulders 14 by spacing disks 18 which fit in the portions 12 of the bore of the tubular body 7 and are clamped against the valve seat members 17 by the aforesaid screw plugs 8.

Each of the disks 18 is provided with a peripheral groove 19 which establishes communication between an air drain opening or vent 20 in the adjacent portion of the tubular body 7 and a plurality of passages 21 which extend radially inward in the disk 18 for part of their length and then laterally outward in the disk 18 through the outer face of the disk 18. The inner end portions of the screw plugs 8 are enlarged internally to produce chambers 22 in which valves 23 are slidably disposed. The valves 23 have stems 24 at their inner sides extending slidably through the adjacent members 18 and 17. The valves 23 are provided with central openings 25 which extend through the stems 24 longitudinally of the latter and establish communication between the chamber 9 and the spaces within the plugs 8 outwardly of the valves 23, which last named spaces are in open communication with the sections 6 of the brake line. The valves 23 have relatively wide circular channels 26 in their inner faces for the reception of seating rings 27 of rubber, leather, or any other suitable material. When each valve 23 is at the limit of its possible inward movement in the valve body as shown in the left hand end portion of Figure 2, the seating ring 27 of that valve will bear against the rounded edges of the spaced concentric outwardly extending valve seat ribs 28 and 29, respectively, on the outer face of the adjacent disk 18, thus producing an air-tight cover for the inner ends of the air drain passages 21. The valves 23 have a substantially air-tight sliding fit with the walls of the chambers 22 but the fit of the valve stems 24 with the inner walls of the associated members 17 and 18 is closed but not air-tight for a purpose which will hereinafter be stated.

The wall of the chamber 9 is provided adjacent to its opposite ends with annular grooves 30 which communicate with the opposite ends of a longitudinally extending delivery outlet port 31 in the tubular body 7 at one side of the chamber 9. The outlet port 31 opens intermediate its length into the bore of a laterally extending delivery outlet nipple 32 with which an end portion of a delivery pipe 33 is connected. The delivery pipe 33 is adapted to lead from the nipple 32 to the air brake cylinder 34 of the aforesaid air brake system as shown in Figure 1. The middle portion of the port 31 also is connected with the middle portion of the chamber 9 by a lateral port 35 for a purpose to be presently stated.

The outer ends of each of the valves 10 is provided with a marginal seating bead 36 having a rounded edge so as to assure airtight contact of the valve 10 and the adjacent valve seat member 17 when the valve 10 is at the limit of its outward movement in the chamber 9 as shown in the right hand portion of Figure 2. The valves 10 normally are in endwise contact with each other and the length of the two valves 10 combined is less than the length of the chamber 9 and greater than the distance between the channels 30 so that one of the channels 30 will be completely covered and the other channel will be at least partially uncovered when the valves 10 have been moved as a unit to either end of the chamber 9. The operation of the parts of the device which have been described so far is substantially as follows:—

Assuming that the left hand engineer's valve 2 of the air brake system shown in Figure 1 has been operated to effect a service application of the brakes, air will flow under pressure through the left hand section 6 of the brake line into the tubular body 7 of the improved valve against the adjacent piston valves 10 and will force the piston valves 10 to the position shown in Figure 2, thus opening the left hand valve 10 and closing the right hand valve 10 and the right hand section 6 of the brake line, the right hand section 6 of the brake line thus being closed against the passage thereinto of air from the left hand section 6 of the brake line and air will pass from the latter through the left hand channel 30 into the delivery port 31 and thence through the delivery pipe 33 to the air brake cylinder 34 to effect application of the brakes. When the left hand engineer's valve 2 has been actuated to connect the left hand section 6 of the brake line with the atmosphere, the brakes will be released and the air will flow back from the brake cylinder and the pipe 33 through the left hand section 6 of the brake line to the engineer's valve 2 and thence to the atmosphere in the usual manner. Any air that is trapped in the left hand section 6 of the brake line and in the adjacent end of the tubular body 7 of the improved valve after the left hand engineer's valve 2 has been closed will drain from the valve body 7 to the atmosphere between the stem 24 of the left hand valve 23 and the members 17 and 18 and the passages 21, the channel 19 and the drain outlet 20 as soon as the right hand engineer's valve 2 has been actuated in the manner hereindescribed to close the left hand valve 10 and to open the right hand valve 10 for a service application of the brakes because of the action of air that passes through the right hand portion of the body 7 of the improved valve to the delivery pipe 33 and thence to the brake cylinder 34. In each instance, the inactive section of the brake line is shut-off from the active section of the brake line and waste of the operating air is obviated.

The improved valve also is adapted to serve as a connection between an emergency air pipe 36 and the delivery pipe 33 that leads to the brake cylinder. To this end, the tubular body 7 is formed with a lateral tubular extension 37. The tubular extension 37 preferably is located opposite the delivery outlet nipple 32 and has its inner end portion formed to produce a chamber 38 in which a piston valve 39 is slidable. The tubular extension 37 is enlarged at the outer end of the chamber 38 at 40 to receive an annular valve seat member 41 and to produce an outwardly facing shoulder 42. The outer end portion of the tubular extension 37 is further enlarged internally at 43 and is provided with screw threads for engaging with the external screw threads on the centrally apertured and internally screw threaded plug 44 which connects the tubular connection 37 with the emergency air pipe 36. The latter of course, is also connected with an emergency valve mechanism as indicated at 45 in Figure 1.

The screw plug 44 holds the valve seat member 41 against the shoulder 42.

A bell crank lever 46 is fulcrumed at 47 on a transverse pivot element in the inner end portion of the chamber 38 and has a shifter arm 48 extending through an opening 49 in the adjacent wall of the chamber 9 and having a rounded end portion disposed in the registering notches 50 in the adjacent ends of the valves 10. The bell crank lever 46 also has a pair of oppositely extending actuating arms 51 which extend substantially at right angles with the shifter arm 48 and have substantially round end portions adapted to move into and out of the laterally extending end portions of a transverse cavity 52 in the inner end of the chamber 38 as the bell crank lever 46 is rocked about its fulcrum. In Figure 2, the left hand arm 51 of the bell crank lever is shown in the corresponding end portion of the cavity 52 and the other arm 51 is shown out of the cavity 52 and in position to force the piston valve 39 outwardly in the chamber 36 against the valve seat 41.

The tubular extension 37 has longitudinally extending passages 53 which communicate at their inner ends with the opposite ends of the cavities 52 and which extend parallel with the chamber 38 for the greater part of the length of the latter, the outer ends of the passages 53 being turned inwardly at 54 to communicate with the chamber 38 adjacent to the outer end of the latter. The outer end portions 54 of the passages 53 are covered by the piston valve 38 when the piston valve is at the outer end of its stroke as shown in Figure 2. However, should an emergency application of the brakes be desired, the piston valve 39 would be forced inwardly in the chamber 38 until the outer ends of the passages 53 are uncovered. This inward movement of the piston valve 39 would actuate the bell crank lever 46 to shift the left hand valve 10 from the position shown in Figure 2 to closed position so that the air for the emergency application of the brakes would pass through the passages 53 into the cavity 52 then through the opening 49 into the chamber 9 between the valves 10 and from the chamber 9 through the opening 35 into the delivery pipe 33 and thence to the brake cylinder. Both end sections 6 of the brake line thus are closed off from the operating air. The used air would return to the emergency air line 36 by the same route for escape to the atmosphere after the brakes have been released.

It is desirable that the valves 10 shall be held against accidental shifting or endwise play in the chamber 9. The invention therefore provides spring pressed latching pins 55 which are slidable in lateral bores 56 in a laterally "embossed" middle portion 57 of the tubular body 7 and have convexly curved inner ends 58 pressed against the peripheries of the piston valves 10 by the springs 59. The springs 59 are confined in the bores 56 between the outer ends of the latch pins 55 and screw plugs 60. Each piston valve 10 is provided in its periphery with a concave recess 61 which the convexly curved inner end portion of the associated latch pin 55 will enter when that piston valve 10 is in open position so that the latch pins 55 will exert a more positive holding action on the piston valves 10 when the latter are in open position than when the piston valves 10 are in any other position. However, the spring pressed latch pins 55 will be ineffective to prevent longitudinal movement of the valves 10 in the chamber 9 in response to the actuation of the bell crank lever 46 or the actuation of operating air from the end sections 6 of the brake line.

The inner ends of the valve stem 24 may be provided with radial notches as indicated at 62 in Figure 8 to facilitate drainage of trapped air from the inactive section 6 of the brake line and from the adjacent end of the valve body 7 in the manner hereinbefore described.

From the foregoing description of the improved valve and its mode of operation, it will be manifest that a considerable saving of air that otherwise would be wasted will be effected when the improved valve is used in an air brake system between the brake line and the brake cylinder when the flow of air through the brake line is controlled by engineer's valves at opposite ends of the brake line in the manner hereinbefore described and particularly when the air brake system with which the valve is used is of the straight air type.

Obviously, the invention is susceptible of embodiment in forms other than that which is illustrated in the accompanying drawings and I therefore consider as my own all such modifications and adaptations thereof as fairly fall within the scope of the appended claims.

I claim:—

1. A valve comprising a tubular body having inlets at its opposite ends and having a delivery outlet intermediate its ends, said valve having a pair of inwardly facing valve seats respectively located between said outlet and said inlet, and a pair of piston valves slidable in said tubular body between said valve seats and each adapted when in contact with its valve seat to cut off communication between the adjacent inlet and said outlet and also adapted when at the limit of its stroke away from its seat to permit communication between the adjacent inlet and said outlet.

2. A valve comprising a tubular body having inlets at its opposite ends and having a delivery outlet intermediate its ends, said valve having a pair of inwardly facing valve seats respectively located between said outlet and said inlet, a pair of piston valves slidable in said tubular body between said valve seats and each adapted when in contact with its valve seat to cut off communication between the adjacent inlet and said outlet and also adapted when at the limit of its stroke away from its seat to permit communication between the adjacent inlet and said outlet, said piston valves being operable in unison by pressure fluid from either of said inlets, and friction latch means tending to retain said piston valves in any adjusted positions in said valve body.

3. A valve comprising a tubular body having inlets at its opposite ends and having a delivery outlet intermediate its ends, said valve having a pair of inwardly facing valve seats respectively located between said outlet and said inlet, a pair of piston valves slidable in said tubular body between said valve seats and each adapted when in contact with its valve seat to cut off communication between the adjacent inlet and said outlet and also adapted when at the limit of its stroke away from its seat to permit communication between the adjacent inlet and said outlet, said piston valves being operable in unison by pressure fluid from either of said inlets, and friction latch means tending to retain said piston valves in any adjusted positions in said valve body, said friction means comprising a pair of spring pressed latch pins having rounded inner ends pressed against the peripheries of said piston valves, said piston valves having concavities in their peripheries for engaging with the rounded inner ends of the latch pins when the piston valves are in open positions.

4. A valve of the character described comprising a tubular body having inlets for pressure fluid at its opposite ends and having a lateral outlet intermediate its ends, a pair of inwardly facing valve seats in said tubular body, each located between said outlet and the adjacent inlet, a pair of piston valves slidable in said tubular body between said valve seats and adapted to be moved in unison by pressure fluid from either of said inlets to positions to close communication between the other inlet and the outlet and to open communication between the first inlet and the outlet, said tubular body having lateral fluid pressure drain openings located between the respective valve seats and the adjacent ends of the tubular body, disks disposed in the end portions of said tubular body having passages opening at their inner ends through the outer faces of the disks and in communication at their outer ends with said fluid pressure drain openings, and a pair of additional valves respectively disposed in said tubular body at the outer sides of said disks and each movable to and from positions to cover the inner end of the passage in the associated disk.

5. A valve of the character described comprising a tubular body having inlets for pressure fluid at its opposite ends and having a lateral outlet intermediate its ends, a pair of inwardly facing valve seats in said tubular body, each located between said outlet and the adjacent inlet, a pair of piston valves slidable in said tubular body between said valve seats and adapted to be moved in unison by pressure fluid from either of said inlets to positions to close communication between the other inlet and the outlet and to open communication between the first inlet and the outlet, said tubular body having lateral fluid pressure drain openings located between the respective valve seats and the adjacent ends of the tubular body, disks disposed in the end portions of said tubular body having passages opening at their inner ends through the outer faces of the disks and in communication at their outer ends with said fluid pressure drain openings, and a pair of additional valves respectively disposed in said tubular body at the outer sides of said disks and each movable to and from position to cover the inner end of the passage in the associated disk, said disks having spaced concentric valve seat ribs between which the inner ends of the passages in the disks are located, said last named valves having hollow stems extending through said disks and through said first named valve seats to positions to be contacted by said first named valves when said second named valves are in closed positions.

6. A valve of the character described comprising a tubular body having inlets for pressure fluid at its opposite ends and having a lateral outlet intermediate its ends, a pair of inwardly facing valve seats in said tubular body, each located between said outlet and the adjacent inlet, a pair of piston valves slidable in said tubular body between said valve seats and adapted to be moved in unison by pressure fluid from either of said inlets to positions to close communication between the other inlet and the outlet, said tubular body having lateral fluid pressure drain openings located between the respective valve seats and the adjacent ends of the tubular body, disks disposed in the end portions of said tubular body having passages opening at their inner ends through the outer faces of the disks and in communication at their outer ends with said fluid pressure drain openings, and a pair of additional valves respectively disposed in said tubular body at the outer sides of said disks and each movable to and from position to cover the inner end of the passage in the associated disk, said disks having spaced concentric valve seat ribs between which the inner ends of the passages in the disks are located, said last named valves having hollow stems extending through said disks and through said first named valve seats to positions to be contacted by said first named valves when said second named valves are in closed position, said hollow valve stems having radial notches in their inner ends to permit leakage of pressure fluid therethrough when the adjacent first named valve is in closed position and the associated second named valve is in open position.

7. A valve of the character described comprising a tubular body having inlets for pressure fluid at its opposite ends and having a delivery outlet for the pressure fluid intermediate its ends, said valve having an inwardly facing valve seat between each inlet and the outlet, a pair of piston valves movable in the tubular body between said valve seats, said piston valve being adapted to be moved in unison by pressure fluid from either of said inlets to positions to cover the other inlets and to permit communication between the first inlet and the outlet, said tubular body having a lateral tubular extension intermediate its ends and having communication with the bore of the tubular body intermediate said valve seats, said lateral tubular extension having an inwardly facing valve seat adjacent its outer end and being adapted for connection with a source of pressure fluid supply, said lateral tubular extension having a passage opening at its outer end into the space within the tubular extension inwardly of said last named valve seat and in communication at its inner end with the opening between said lateral tubular extension and the bore of the tubular body of the valve, a piston slidable in said lateral tubular extension to and from position to contact with said last named valve seat and to close the outer end of said passage in the lateral tubular extension, said first named piston valves having registering notches on their inner ends at the inner end of said lateral tubular extension, and motion transmitting means between said piston valve of the lateral tubular extension and the notched portions of the pistons of the tubular body tending to maintain the piston valve of the lateral tubular extension on its seat and in position to cover the outer end of the associated passage when one of the first named piston valves is in open position and acting to move said open first named piston valve to closed position when the piston valve of the lateral tubular extension is moved inward by fluid pressure to position to uncover the outer end of the associated passage.

8. A valve of the character described comprising a tubular body having inlets for pressure fluid at its opposite ends and having a delivery outlet for the pressure fluid intermediate its ends, said valve having an inwardly facing valve seat between each inlet and the outlet, a pair of piston valves movable in the tubular body between said valve seats, said piston valve being adapted to be moved in unison by pressure fluid from either of said inlets to positions to cover the other inlets and to permit communication between the first inlet and the outlet, said tubular body having a lateral tubular extension intermediate its ends and having communication with the bore of the tubular body intermediate said valve seats, said lateral tubular extension having an inwardly facing valve seat adjacent its outer end and being adapted for connection with a source of pressure fluid supply, said lateral tubular extension having a passage opening at its outer end into the space within the tubular extension inwardly of said last named valve seat and in communication at its inner end with the opening between said lateral tubular extension and the bore of the tubular body of the valve, a piston slidable in said lateral tubular extension to and from position to contact with said last named valve seat and to close the outer end of said passage in the lateral tubular extension, said first named piston valves having registering notches in their inner ends at the inner end of said lateral tubular extension, and motion transmitting means between said piston valve of the lateral tubular extension and the notched portions of the pistons of the tubular body tending to maintain the piston valve of the lateral tubular extension on its seat and in position to cover the outer end of the associated passage when one of the first named piston valves is in open position and acting to move said open first named piston valve to closed position when the piston valve of the lateral tubular extension is moved inward by fluid pressure to position to uncover the outer end of the associated passage, said motion transmitting means comprising a bell crank fulcrumed in the inner end of the lateral tubular extension and having a shifter arm extending between the notched portions of the first named piston and a pair of oppositely extending outer arms successively engageable with the piston of the lateral tubular extension to maintain said piston closed as the piston valves of the tubular body are opened and closed successively.

9. A valve of the character described comprising a tubular body having inlets for pressure fluid at the opposite ends and having a delivery outlet for the pressure fluid intermediate its ends, said valve having an inwardly facing valve seat between each inlet and the outlet, a pair of piston valves movable in the tubular body between said valve seats, said piston valve being adapted to be moved in unison by pressure fluid from either of said inlets to positions to cover the other inlets and to permit communication between the first inlet and the outlet, said tubular body having a lateral tubular extension intermediate its ends and having communication with the bore of the tubular body intermediate said valve seats, said lateral tubular extension having an inwardly facing valve seat adjacent its outer end and being adapted for connection with a source of pressure fluid supply, said lateral tubular extension having a passage opening at its outer end into the space within the tubular extension inwardly of said last named valve seat and in communication at its inner end with the opening between said lateral tubular extension and the bore of the tubular body of the valve, a piston slidable in said lateral tubular extension to and from position to contact with said last named valve seat and to close the outer end of said passage in the lateral tubular extension, said first named piston valves having registering notches on their inner ends at the inner end of said lateral tubular extension, and motion transmitting means between said piston valve of the lateral tubular extension and the notched portions of the pistons of the tubular body tending to maintain the piston valve of the lateral tubular extension on its seat and in position to cover the outer end of the associated passage when one of the first named piston valves is in open position and acting to move said open first named piston valve to closed position when the piston valve of the lateral tubular extension is moved inward by fluid pressure to position to uncover the outer end of the associated passage, said motion transmitting means comprising a bell crank fulcrumed in the inner end of the lateral tubular extension and having a shifter arm extending between the notched portions of the first named piston and a pair of oppositely extending outer arms successively engageable with the piston of the lateral tubular extension to maintain said piston closed as the piston valves of the tubular body are opened and closed successively, the arms of said bell crank having rounded end portions.

10. A compressed air brake system of the character described comprising in combination a source of compressed air, a brake cylinder, a pair of application valves located remotely from each other, pipe connections between each application valve and the brake cylinder, and valve means interposed in said pipe connections whereby with applying compressed air to the brake cylinder from one application valve no compressed air will be permitted to enter pipe connections between the brake cylinder and the other application valve.

11. A compressed air brake system of the character described comprising in combination a source of compressed air, a brake cylinder, a pair of application valves located remotely from each other, pipe connections between each application valve and the brake cylinder, valve means interposed in said pipe connections whereby with applying compressed air to the brake cylinder from one application valve no compressed air will be permitted to enter pipe connections between the brake cylinder and the other application valve, and valve means and connections therefor associated with the last named valve means whereby an emergency application of compressed air may be made to said brake cylinder.

SAMUEL J. EVANS.